United States Patent [19]

Cooper

[11] 4,347,915
[45] Sep. 7, 1982

[54] GREASE FITTING

[75] Inventor: Jack M. Cooper, Houston, Tex.

[73] Assignee: General Screw Products Company, Houston, Tex.

[21] Appl. No.: 124,444

[22] Filed: Feb. 25, 1980

[51] Int. Cl.³ .................................................. F16N 5/02
[52] U.S. Cl. ................................. 184/105 B; 137/539
[58] Field of Search .................... 184/105 B; 137/539

[56] References Cited

U.S. PATENT DOCUMENTS

| | | | |
|---|---|---|---|
| 1,942,313 | 1/1934 | Viele et al. | 137/539 X |
| 2,400,817 | 5/1946 | Fox et al. | 137/539 X |
| 2,761,468 | 9/1956 | Thatcher | 137/539 |
| 2,878,896 | 3/1959 | Farrell | 184/105 B |
| 2,918,084 | 12/1959 | Madar et al. | 137/539 |
| 3,437,082 | 4/1969 | Bouwkamp et al. | 137/539 |
| 3,791,406 | 2/1974 | Phillips | 137/539 X |

FOREIGN PATENT DOCUMENTS

1115975  1/1956  France .................... 137/539

*Primary Examiner*—David H. Brown
*Attorney, Agent, or Firm*—Carwell & Helmreich

[57] ABSTRACT

An improved grease fitting is provided particularly suitable in high pressure applications where a polyester plasticizer is intermingled with a lubricant. In one embodiment of the invention, a metal ball is biased by a cylindrical helical spring for sealing engagement with a plastic seat. A leg of the spring passes through the axis of the fitting, so that when grease is forced through the fitting, the unseated ball moves rapidly to allow the plasticizer and lubricant to pass through the fitting with less resistance. The helical spring is enclosed in a sleeve, and a stop on the sleeve enables the end of the sleeve to compress the plastic seat to a predetermined extent, thus prolonging the expected life of the plastic seat.

7 Claims, 7 Drawing Figures

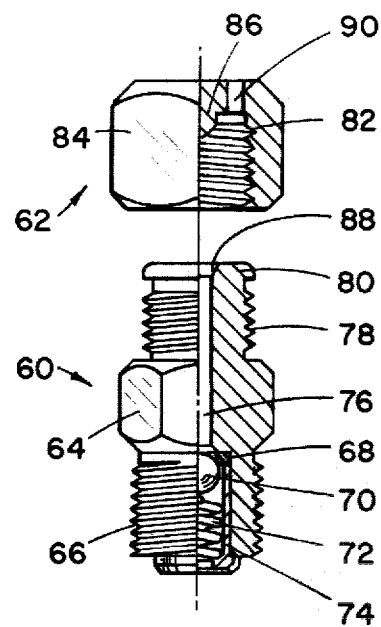
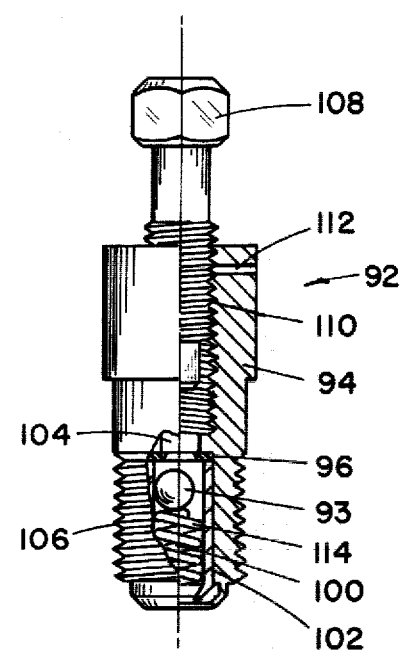
FIG. 4    FIG. 5
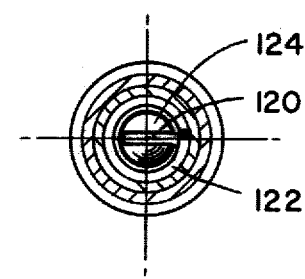
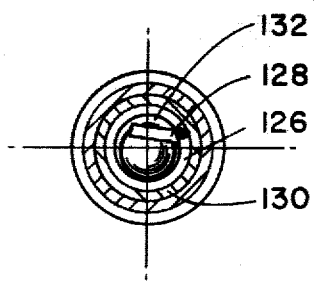
FIG. 6    FIG. 7

GREASE FITTING

BACKGROUND OF THE INVENTION

This invention relates to an apparatus for forcing grease to desired points of lubrication within a mechanical device. The invention is particularly suitable for use in applications where a lubricant and a polyester plasticizer are injected under high pressures into a mechanical device or assembly, such as a valve assembly or a pump assembly.

Many mechanical devices require lubrication in various places within the assembly, especially to locations where significant friction may be encountered. Grease fittings have long been used in order to easily supply lubricant to these frictional points. A grease fitting is generally mounted on an outer surface of a mechanical assembly, and allows grease to "flow" under pressure from a reservoir through the fitting to the frictional points. In addition, grease fittings are generally intended to hold grease under pressure within the fitting and a passageway within the mechanical assembly from the fitting to the frictional points, so that grease will be automatically supplied to the intended places when required.

In recent years, it has become common to use grease not only for a lubricant, but also as the carrier of plastic particles designed to act as a sealer or a packing material. Pumps and valves typically have places between a rotational member and a stationary member where a packing is inserted. The packing material, such as Teflon TM or graphite impregnated asbestos, acts to some extent as a lubricant, but is principally intended to seal that area and make up dimensional variations between the rotational and stationary members. Since the packing material may tend to disintegrate during continued operation, it has been found necessary to repack pumps and valves on a regular basis. Rather than dismembering the assembly for repacking, it has been found acceptable in many applications to inject grease and a packing-type material to the desired area. Regular injection of the grease/packing material composition replenishes the packing in the assembly and offers an efficient technique for substantially reducing both equipment down time and maintenance costs.

The grease/packing material mixture typically has a consistency similar to the packing, and is generally highly viscous. It has therefore been necessary to inject this mixture under high pressures to cause "flow" to the desired locations. Since the mixture is preferably injected on a regular basis and one piece of equipment may have a plurality of places requiring a packing material, grease fittings have been employed to enable a hand gun or other mechanism to be easily attached to the fitting for injecting the mixture. The grease/packing material mixture is therefore injected under pressure from the gun through the fitting to the desired place within the assembly.

Some commercial high pressure grease fittings have a metallic ball which is acted upon by a spring to normally engage a seat and thus seal the grease within the fitting and the mechanical assembly. When a grease gun is attached to the fitting, the pressure of the injected grease unseats the ball and allows grease to enter the fitting and a passageway from the fitting to the desired place within the assembly. Movement of the ball away from the seat typically compresses the spring, and grease is allowed to flow between the ball and the internal walls of the fitting.

A problem has repeatedly been encountered with the use of conventional grease fittings and grease/packing material mixtures. The packing material particles may become lodged between the ball and the internal wall of the fitting, so that the fitting becomes "plugged" and further passage of the mixture is not possible. When a fitting becomes plugged, the pressure from the gun is often increased in an attempt to "clear" the fitting. The pressure within the fitting is often increased, however, to the extent that the fitting "blows out". During blow-out of a fitting, the high pressure build up in the fitting causes a spring retainer to give way, so that the ball and spring can be expelled from the fitting.

The possible detrimental effects of a plugged or blown-out fitting are numerous. Additional lubrication may not be injected through a plugged fitting, so that the packing may deteriorate, causing a leak. Alternatively, the surfaces in the area of the packing may become scoured or otherwise damaged because the packing is not being replaced. If the fitting blows out, the ball may not seat to hold the lubricant in the assembly. More serious, however, is the possibility that the spring, ball, or other portions of the fitting may be forced into the area of the packing and damage the equipment intended to be lubricated.

It is advantageous, at times, to provide a grease fitting wherein the ball seats with a plastic seal, rather than having a metal-to-metal seal. In commercial fittings, a plastic seal may be held in place by a sleeve which is thereafter secured in a fixed position.

An additional problem associated with conventional fittings is that the sleeve either presses against the plastic seal with too much force, so that the seal is damaged, or that the sleeve does not provide sufficient force to render the seal immovable. Either one of these conditions has a detrimental effect on the expected life of the seal, and it is a feature of this invention to prolong the life of a plastic seal within a grease fitting.

The instant invention provides a grease fitting particularly suitable for use in high pressure applications utilizing a mixture of a lubricant and a polyester plasticizer. The disadvantages of prior art grease fittings are overcome with the present invention, and an improved grease fitting is hereinafter provided.

SUMMARY OF THE INVENTION

In an exemplary embodiment of this invention, the body of a grease fitting may be mounted to a mechanical device by means of external threads on one end of the body. A generally cylindrically-shaped passageway is provided through the grease fitting for allowing lubricant to pass from a grease gun through the fitting and subsequently to the desired location within the mechanical device.

A metal ball and a cylindrical-shaped helical spring are provided within a metal sleeve, and the sleeve is positioned within a portion of the cylindrically-shaped passageway. A Teflon TM washer is positioned over a metal seat within the cylindrically-shaped passageway, so that the metal ball is normally seated against the Teflon TM washer and is biased in that position by the spring.

During assembly of the novel fitting, the Teflon TM washer is placed against the metal seat within the cylindrical-shaped passageway in the body of the fitting. The metal ball and then the spring may be thereafter inserted into the passageway, so that one side of the ball is in contact with the Teflon TM washer, and the other side of the ball is in contact with the spring. A sleeve may thereafter be inserted into the passageway, and encloses the ball and the spring. The first end of the sleeve is designed for contact with the Teflon TM washer, while the other end of the sleeve is relatively flush with the end of the fitting to be threaded into the mechanical device. The sleeve contains a shoulder portion for engagement with the body of the fitting, so that the first end of the sleeve applies sufficient compressional force to the Teflon TM washer, but does not damage the washer. A lip formed as part of the body of of the fitting may thereafter be crimped over the other end of the sleeve, so that the sleeve is held stationary and the spring is compressed against the ball.

The end of the spring in contact with the ball also has a leg portion which passes through the central axis of the fitting. After these components of the fitting have been assembled, the end of the fitting flush with the sleeve may thereafter be threaded into the mechanical device for its intended purpose.

During normal use, the force of the spring seals the ball against the Teflon TM washer, so that the lubricant cannot escape from the mechanical device through the fitting. Since the lubricant or lubricant/packing mixture is generally under pressure within the mechanical device, the mixture will flow to the selected locations within the device as required.

When desired, additional lubricant may be supplied to the mechanical device through the fitting in the following manner. A grease gun may be attached to the end of the fitting protruding from the device. Grease, under pressure, is forced into the passageway of the fitting and into contact with the ball. As the pressure is increased from the gun, the spring is compressed and the ball unseats from the Teflon TM washer, allowing lubricant to flow past the ball and into the device. Since the leg of the spring acting against the ball passes through the axis of the passageway, the unseated ball shifts to one side of the passageway as it moves away from the Teflon TM washer. Since the ball has shifted out of alignment with the passageway, lubricant may flow past the ball with less resistance. When a sufficient amount of grease has been added, the gun may be removed from the fitting and the pressure of the lubricant within the mechanical device, in addition to the force of the spring, returns the ball to its normal seated position against the Teflon TM washer. It is a feature of this invention to provide a grease fitting which is less susceptible to being plugged by a high viscocity lubricant.

Another feature of this invention is to provide a grease fitting in which the sealing members are less likely to be blown-out of the fitting.

A further feature of this invention is to provide an improved grease fitting which may be used in conjunction with a grease/polyester plasticizer mixture.

Still another feature of this invention is to prolong the expected life of the sealing members within a grease fitting.

It is a further feature of this invention to provide a grease fitting, comprising a body member having a passageway through said body member and having a substantially circular seating surface within said passageway, a ball member within said passageway for sealing engagement with said circular seating surface, a spring within said passageway biasing said ball member toward said seating surface, and a leg portion secured to said spring and in contact with said ball member for substantially diverting said ball member out of alignment with the axis of said circular seating surface when said ball member is out of engagement with said seating surface.

These and other features and advantages of this invention will become apparent in the foregoing detailed description, wherein reference is made to the figures in the accompanying drawings.

IN THE DRAWINGS

FIG. 4 is a pictorial representation, partly in cross section, of another embodiment of the invention depicted in FIG. 1.

FIG. 5 is a pictorial representation, partly in cross section, of another embodiment of the invention depicted in FIG. 1 and FIG. 4.

FIG. 6 is a cross-sectional end view of the one embodiment of the present invention in a "closed" position.

FIG. 7 is a cross-sectional end view of the embodiment depicted in FIG. 6 in an "open" position.

DETAILED DESCRIPTION

Figures 1, 2:
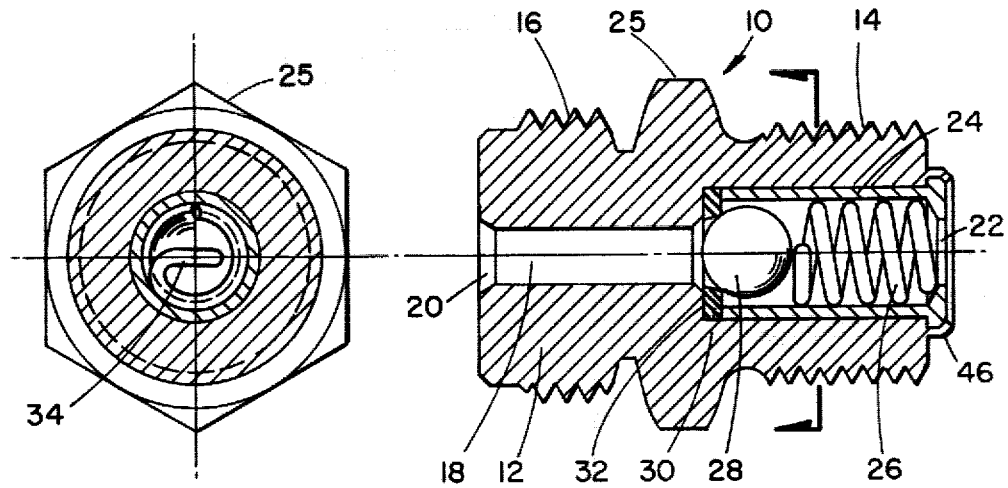
FIG. 1 is a pictorial representation of an exemplary embodiment of the present invention.
FIG. 2 is a cross-sectional representation of a portion of the apparatus depicted in FIG. 1.

FIG. 1 is a pictorial representation of improved grease fitting 10 according to the present invention. An elongate body 12 is provided with external threads 14 at the first end of the body, and external threads 16 at the other end of the body. A passageway 18 through the axis of the body allows lubricant to flow into an entrance port 20 from a reservoir (not depicted), through the passageway 18 and out an exit port 22. As shown in FIGS. 1 and 2, the body 12 is provided with a hexagonal portion 24 which allows the body to be easily gripped and rotated by conventional means.

Also shown in FIG. 1 is a sleeve 24 which is fitted into a portion of the passageway 18. A spring 26 and a metal ball member 28 are contained within the sleeve 24. The ball member 28 is shown in contact with a plastic or other pliable-material washer 30, which is pressed against an internal shoulder 32 formed by a portion of the wall of the passageway 18.

As shown in FIGS. 1 and 2, the helical spring 26 is normally acting on the ball 28, so that the ball and washer 30 form a fluid-tight seal. Lubricant may be injected into the port 20 and through the passageway 18, so that the spring 26 is compressed and the ball 28 becomes unseated from the washer 30. When the ball is unseated, fluid may continue to pass through the passageway 18 and exit from the port 22 to selected places within a suitable mechanical device, such as a valve body (not depicted).

In FIG. 2, it may be seen that the end of the spring 26 in contact with the ball 28 is provided with a leg portion 34, so that it is the leg portion 34 of the spring which actually is forcing the ball toward its seated position. Also, the leg portion 34 passes through the axis of the passageway 18, so that when the ball 28 becomes unseated, the ball will move radially into contact with the inner wall of the sleeve 24.

Figure 3:
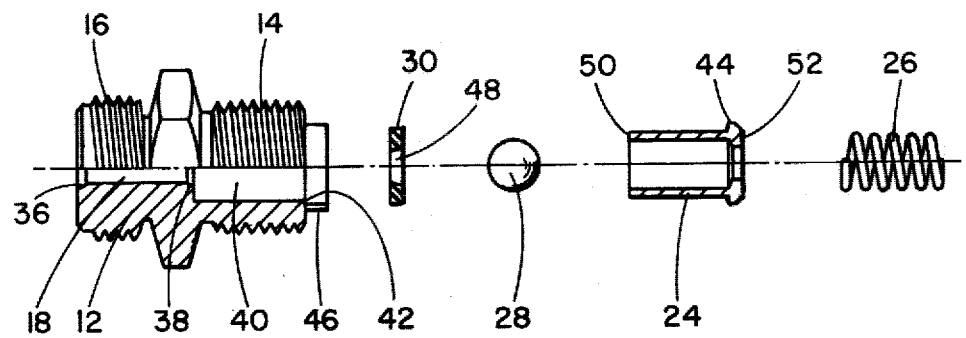
FIG. 3 is a pictorial representation, in an exploded format and partially in cross section, of the apparatus generally depicted in FIGS. 1 and 2.

FIG. 3 is an exploded view of the apparatus described above, wherein each component of the novel fitting is shown separately. The left-hand end of the body 12 contains external thread 16 which enable a grease gun or other lubricant reservoir (not depicted) to be readily attached and detached from the fitting. The opening 20 of the passageway 18 is provided with a chamfered surface 36 which enables grease to be more easily injected into the passageway 18. From FIGS. 1, 2 and 3, it may be noted that the axis of the body 12 is also the axis of the passageway 18, so that—except for the restriction of the ball—the lubricant may pass through the fitting by a low-resistance path.

Another chamfered surface 38 is provided adjacent the internal shoulder 32. If the washer 30 were to become worn, the chamfered surface 38 and the ball 28 may provide a metal-to-metal seal. An enlarged portion 40 of the passageway 18 has an internal diameter to accommodate the external diameter of the sleeve 24. As previously mentioned, the right-hand and/or first end of the body 12 contains external threads 14 which enable the body to be threaded into a mechanical device, such as a valve or pump (not depicted).

A shoulder 42 is provided on the body for engagement with an outer flange or stop 44 on the right-hand end of the sleeve 24. The body 12 is also provided with a tab or lip portion 46, which may be crimped over the right-hand end of sleeve 24 to secure the sleeve within the body (see FIG. 1).

The plastic washer 30 has an external diameter approximating the internal diameter of the enlarged portion 40 of the passageway. The opening 48 in the plastic washer is beveled at approximately 15° so that the ball 28 may properly seat with the plastic washer. Also, the opening 48 in the washer is slightly smaller than the largest portion of the chamfered surface 38. When lubricant in the fitting is under relatively low pressure, e.g. 100 PSIG, the ball 28 would normally seat against the plastic or other pliable-material washer 30. Under this relatively low pressure the pliable washer 30 provides a better seal than a metal-to-metal seal. If lubricant in the fitting is under high pressures, such as 10,000 PSIG or 15,000 PSIG, the pressure on the ball 28 may deform the pliable washer 30, so that the ball also seats against the chamfered surface 38. Thus, when the fitting is subjected to the high pressures for which it is designed, a metal-to-metal seal may be formed by the ball 28 and the chamfered surface 38, which will provide an effective seal under high pressures.

The left-hand end of the sleeve 24 contains a surface 50 which, when assembled, secures the plastic washer 30 in the fitting against the internal shoulder 32. An internal flange 52 at the right-hand end of the sleeve secures the spring 26 within the fitting after the lip or tab 46 has beem crimped over the outer flange 44 of the sleeve 24. As previously noted, the left-hand end portion of the spring 26 is provided with a leg 34 which passes through the axis of the passageway 18. When the ball 28 becomes unseated, the leg 34 acting against the ball causes the ball to shift off the axis of the passageway and come into contact with the internal surface of the sleeve 24.

During assembly, the washer 30 may be placed within the enlarged portion 40 of the passageway 18, with the smaller portion of the opening 48 in contact with the internal shoulder 32. The ball 28 and spring 26 may then be inserted into the enlarged portion 40, followed by the sleeve 24. Alternatively, the spring may be placed within the sleeve 24 and then the sleeve and spring inserted together into the enlarged portion 40.

When the sleeve 24 is in place, the outer flange or stop 44 on the sleeve is in contact with the shoulder or stop 42 on the body. At this time, the surface 50 is pressing the plastic washer 30 against the internal shoulder portion 32. The stop or outer flange 44 of the sleeve 24 therefore enables the sleeve to exert compressional force on the washer of a sufficient amount to secure the washer in place, and prohibits the sleeve from over-compressing the washer so that the washer becomes damaged. The washer 30 may typically be fabricated from Teflon TM and is approximately 0.060 inches thick. The flange 44 and the shoulder 42 typically allow compression of the washer by approximately 0.010 inches. This technique prolongs the life of the plastic washer 30 since the washer is compressed to a sufficient extent that it cannot rotate or otherwise move in the fitting, yet the washer is not over-compressed.

In FIG. 4, there is illustrated another embodiment of the present invention having a body portion 60 and a cap 62. The hexagonal portion 64 enables a conventional tool (not depicted) to secure the body portion to a mechanical device, such as a valve, by threads 66. The body member is shown to contain a plastic washer 68, a ball member 70, a spring 72, a sleeve 74, and a passageway 76, similar to the components illustrated in FIG. 3.

The end of the body member 60 protruding from the mechanical device is shown to contain external thread 78 and a "button head" flange 80. Thus, a grease gun or other lubricant reservoir may either have an end connector specifically adapted for threading to the threaded portion 78, or may have a connector adapted for the "button head" flange 80. The body 60 may be desirable since it has the ability to accommodate either type of end connector. The threads 78 on the body will generally be formed any time a threaded cap 62 is utilized, but if a cap is not utilized, either the threads 78 or the button head flange 80 may be eliminated.

The cap portion 62 having internal threads 82 may be attached to threads 78 (or alternatively to threads 16 in FIG. 1), and a hexagonal portion 84 is provided for that purpose. The portion 62 has a plug number 86 which provides a metal-to-metal seal with the beveled surface 88 of the body portion 60. (Plug number 86 would also provide a metal-to-metal seal with the beveled surface 36 if utilized with the embodiment depicted in FIG. 3). A vent 90 is provided so that pressure within the passageway 76 may be vented as the cap portion 62 is unscrewed from the body portion.

The cap portion 62 protects the threads 78 from damage since they would otherwise be exposed. Also, if the seal provided by the ball 70 and the washer 68 were to leak, the metal-to-metal seal of the plug member 86 and the beveled surface 88 would provide an additional seal to keep the lubricant within the fitting. As cap portion 62 is unscrewed, the vent 90 will equalize any pressure differential and provide means for allowing a person to detect whether the ball-washer seal has failed before removing the cap portion 62.

Another embodiment of the present invention is shown in FIG. 5. The fitting 92 is provided with a body portion 94, a washer 96, a ball 98, a spring 100, a sleeve 102, and a passageway 104, similar to the components in the embodiments previously described. External threads 106 are provided for screwing the body into a mechanical device. The embodiment depicted in FIG. 5 is generally not intended to be utilized with a grease gun or other lubricant reservoir. Rather, the passageway 104 may be packed with a lubricant and the bolt 108 may thereafter be threaded into the internal threads 110 on the body. As additional lubricant is required, the bolt 108 is screwed into the body, so that pressure of the lubricant on the ball 98 compresses the spring 100 to unseat the ball, as illustrated. A vent 112 is provided in the side of the body 94, and serves the same purpose as the vent 90 illustrated in FIG. 4.

Fittings, according to the present invention, may be specifically adapted for use with a grease/polyester plasticizer mixture. The polyester plasticizer particles in the mixture may effectively function as an automatically replaced packing material, which is carried to its intended location within an assembly by the grease or other lubricant. The particles are often, but need not be, true plasticizers, and typical particles may be formed of asbestos, mica, gypsum, fiberglas, nylon, Teflon TM or other materials suitable as a packing. Typically, particles are fibrous and may have a mean diameter range of 0.010 inch to 0.030 inch. The particles are not of uniform size, however, and some fibrous particles having greater diameters and others with smaller diameters would generally be included. The embodiments described above may easily accommodate a highly viscous lubricant/packing material mixture having some particles of polyester plasticizer in the range of 0.125 inch in diameter. A suitable grease/packing material mixture which may be used in conjunction with the fittings described herein is sold by the Chemola Division of Hi-Port Industries, Inc. in Highlands, Texas, under the tradename "Polymel-Pak".

FIG. 5 illustrates one embodiment of the present invention in the "open" position with the ball unseated. It will be noted that in the open position, the particles in the lubricant may pass through the plastic washer 96, around the ball 98, through the space radially inward of the coils of the spring 100, and thereafter out of the fitting 92. In the open position, the ball is shifted substantially in the radial direction, so that the ball comes into contact with the sleeve 102. Thus, except for the smooth deviation around the ball, the mixture travels in a relatively straight path through the fitting 92.

Spring 100 has an outer diameter approximating the internal diameter of the sleeve 102, so that the sleeve also functions as a guide for preventing substantial radial movement of the coils of the spring. When the ball 98 is unseated, larger particles can pass by the ball than was possible in prior embodiments in which the unseated ball remained substantially aligned with the axis of the passageway and the axis of the opening for the plastic washer 98. In addition, the mixture no longer has to pass between various coils the springs, but rather enters the central opening through the spring between the lower portion of the ball and adjacent coil 114 of the spring.

The present invention provides a relatively straight path through the fitting, plus a flow-path which can accommodate passage of the particles used in may grease/packing material mixtures. In an unseated condition, the area between the ball 98 and the sleeve 102 is less of a bottle-neck that in previous grease fittings. The particles in the mixture therefore do not tend to become plugged in the area of the ball and the spring, so that the likelihood of having a detrimental plugged fitting is substantially eliminated. Also, serious blow-out problems are avoided since the fitting does not tend to plug and less pressure is required to force the mixture through the fitting.

FIGS. 6 and 7 illustrate cross-sectional views of one embodiment of the present invention, with FIG. 6 showing a "closed" position and FIG. 7 showing a "open" position. In the closed position, the leg 120 of the spring 122 passes through the axis of the passageway of the fitting. Specifically, the leg 122 also passes through the axis of the seating surface. The seat and force of the spring acting on the ball therefore keep the ball 122 in a normally seated position, with the center of the ball aligned with the axis of the seating surface.

In the open position illustrated on FIG. 7, the ball has moved away from the seating surface. As the mixture is introduced into the fitting, the increased pressure acts on the ball and compresses the spring 126. Since the leg 128 of the spring is circular in cross-section, the ball tends to move radially from the axis of the seating surface until the ball contacts the side of the sleeve 130. The grease/particle mixture can pass by the ball in the area 132 between the ball and the side of the sleeve 130. When the ball is unseated and has moved into contact with the sleeve, the leg 128 of the spring may shift slightly off the axis of the seating surface. This effect is shown in FIG. 7, although the shift of the leg will generally not be so drastic in reality as illustrated in FIG. 7. A slight shift of the leg 128 is not necessarily undesirable, since this tends to increase the radial force keeping the ball in contact with the sleeve and eccentric wire respect to the axis of the seating surface. When the mixture is no longer forced into the fitting and the corresponding pressure differential across the ball decreases, the spring acting on the ball returns the ball to its seated position, and the center of the ball and the leg of the spring will again pass through (or very close to) the axis of the seating surface.

In some applications, it is preferable that the leg of the spring pass through the axis of the seating surface. In this case, the ball may shift to either side of the passageway when the ball is unseated. Also, when the ball is in its seated position, the point on the leg of the spring in contact with the ball is on or very near the axis of the seating surface. Thus, the spring acting on the seated ball forces the ball directly into the seating surface, with very little if any force tending to move the seated ball radially. This feature may prolong the life of the seating surface and the ball, and any wear that would occur in either the ball or the seating surface would be generally uniform.

It is possible, however, to provide a leg on the spring that need not pass through the axis of the seating surface. For instance, a leg on the spring could be provided which is always set off the axis of the seating surface, so that whether the ball is seated or unseated, the leg would be in a position such as shown in FIG. 7. In this case the ball will generally tend to shift to the same side of the passageway when unseated. Also, the force of the spring is not being applied through the axis of the seating surface when the ball is seated, so that the seating surface may not wear uniformly and may leak in situations where the apparatus, as shown in FIGS. 1 and 2, would not leak. Even though the leg would not pass through the axis of the seating surface, the leg would divert the ball to the side of the passageway when not seated.

Also, the leg of the spring according to this invention need not be perpendicular to the passageway of the fitting. The leg, for instance, may project radially inward from the coils of the spring, and the tip of the leg may be bent so that the bent tip of the leg provides a point for diverting the ball toward the side of the passageway when the ball is unseated.

The passageway of the fitting need not be cylindrical or straight to utilize the concepts of this invention. As long as a passageway of adequate cross-section is provided, the passageway may form a 45° angle or a 90° angle so that a grease gun may be more easily connected to the fitting for adding lubrication.

Many variations are possible within the concept of the present invention. For instance, a plastic washer is not necessarily required, although it generally gives a better seal than is possible by metal-to-metal contact. If the plastic washer is eliminated, the ball could simply seat against a beveled circular seating surface provided by a portion of the wall of the passageway.

Other embodiments of the invention include variations wherein the sleeve is eliminated. The lip of the body may be clamped directly over the end of the spring, and the force of the ball may keep the plastic washer in place. Alternatively, the plastic washer could be glued or pressed into place in the passageway of the fitting.

It is also within the concepts of this invention to use any conventional means to secure the fitting to a mechanical device, and threads have been illustrated as one technique for accomplishing this purpose.

The body of the fitting is preferably fabricated from steel, and may be plated by conventional techniques if desired. A metal ball and a plastic washer have been found to form a good fluid-tight seal even under the high pressures that are required to cause flow of a grease/plasticizer mixture. If a sleeve is employed, it may be conveniently fabricated from metal stock.

The fitting may be used for a variety of lubricants, and it is especially suitable for any mixture having solid particles which might plug conventional fittings. If desired, the techniques described herein in conjunction with a grease fitting can also be used to modify a check valve.

Other alternative forms of the present invention will suggest themselves from a consideration of the apparatus and techniques hereinbefore discussed. Accordingly, it should be fully understood that the apparatus and techniques depicted in the accompanying drawings, and described in the foregoing explanation, are intended as exemplary embodiments of the invention, and not as limitation thereto.

I claim:

1. A fitting for allowing a lubricant to enter a device and retain said lubricant within said device, comprising:
   a body member having a passageway through said body member,
   a pliable washer within said passageway having a substantially circular seating surface formed therein,
   a ball member within said passageway for sealing engagement with said seating surface,
   a spring within said passageway biasing said ball member toward said seating surface,
   a sleeve member within a portion of said passageway containing said ball member and spring and exerting a predetermined compressional force on said pliable washer, and
   a stop on said sleeve member for engagement with said body member for restricting the compressional force exerted on said pliable washer by said sleeve member.

2. Apparatus as defined in claim 1, wherein said stop for restricting the compressional force exerted on said pliable washer comprises a flange portion on said sleeve member and an engaging shoulder portion on said body member.

3. Apparatus as defined in claim 1, further comprising:
   an internal flange on the end of said sleeve member opposite said pliable washer for retaining said spring within said fitting, and
   lip means on said body member for securing said sleeve member within said fitting.

4. Apparatus as defined in claim 1, further comprising:
   a leg portion secured to said spring and in contact with said ball member at a point substantially aligned with the axis of said circular seating surface for minimizing radial forces exerted on said pliable washer by said ball member.

5. Apparatus as defined in claim 4, said leg portion further having a curved surface in contact with said ball member for diverting said ball member radially into engagement with the side walls of said sleeve member when said ball member is forced out of engagement with said seating surface.

6. Apparatus as defined in claim 1 or claim 4, wherein the outer diameter of said spring approximates the inner diameter of said sleeve member for restricting substantial radial movement of said spring relative to said passageway within said body member.

7. Apparatus as defined in claim 1 or claim 4, wherein said ball member is adapted for engagement with the inner diameter of said sleeve member for allowing plasticizer particles to enter said device with said lubricant.

* * * * *